United States Patent

Gibbons et al.

[11] Patent Number: 6,103,322
[45] Date of Patent: Aug. 15, 2000

[54] MATERIALS FOR INDUCING ALIGNMENT OF LIQUID CRYSTALS AND LIQUID CRYSTAL OPTICAL ELEMENTS

[75] Inventors: Wayne M. Gibbons, Bear, Del.; Paul Joseph Shannon, Exton, Pa.; Hanxing Zheng, Wilmington, Del.

[73] Assignee: Elsicon Inc., Wilmington, Del.

[21] Appl. No.: 09/221,295

[22] Filed: Dec. 23, 1998

[51] Int. Cl.$^7$ .................................................. G02F 1/1337
[52] U.S. Cl. .......................... 428/1; 349/123; 428/473.5; 528/125; 528/170; 528/172; 528/176; 528/171; 528/185; 528/188; 528/220; 528/353
[58] Field of Search ............................ 428/1.23, 1, 473.5; 349/123; 528/125, 170, 172, 176, 171, 185, 188, 220, 353

[56] References Cited

U.S. PATENT DOCUMENTS

| 4,974,941 | 12/1990 | Gibbons et al. . |
| 5,032,009 | 7/1991 | Gibbons et al. . |
| 5,276,132 | 1/1994 | Nishikawa, et al. . |
| 5,731,405 | 3/1998 | Gibbons et al. . |

*Primary Examiner*—Alexander Thomas
*Attorney, Agent, or Firm*—Paul J. Shannon

[57] ABSTRACT

The present invention provides novel polyamic acids and polyimide optical alignment layers for inducing alignment of a liquid crystal medium. The novel compositions comprise crosslinking diamines containing a $C_3$–$C_{20}$ linear or branched hydrocarbon chains containing 1 to 4 carbon-carbon double bonds. The invention further describes liquid crystal displays comprising the novel polyimide optical alignment layers.

8 Claims, 2 Drawing Sheets

MATERIALS FOR INDUCING ALIGNMENT OF LIQUID CRYSTALS AND LIQUID CRYSTAL OPTICAL ELEMENTS

This invention was made with United States Government support under Agreement No. MDA972-93-2-0014 awarded by ARPA. The United States Government has certain rights in the invention.

BACKGROUND OF INVENTION

The present invention relates to materials for aligning liquid crystals, and liquid crystal optical elements.

Current liquid crystal display elements include a product that utilize a twisted nematic mode, i.e. having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, an in-plane-switching mode wherein both electrodes controlling the liquid crystal alignment are present on one substrate and the direction of the liquid crystal orientation in the plane of the substrate changes upon application of an electric field, and a product utilizing a ferroelectric liquid crystal substance or an antiferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941 "Process of Aligning and Realigning Liquid Crystal Media" which are hereby incorporated by reference.

The process for aligning liquid crystal media with polarized light can be a noncontact method of alignment that has the potential to reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability and in many applications a controlled uniform pre-tilt angle. Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

Continuing effort has been directed to the development of processes and compositions for optical alignment of liquid crystals and liquid crystal displays. Through diligent effort and intensive experiments we have found that the alignment quality and electrical properties, specifically the voltage holding ratio, of polyimide alignment layers derived from polyamic acids containing the novel crosslinking diamines disclosed herein are significantly improved over those lacking such crosslinking capability.

SUMMARY OF INVENTION

The present invention provides a polyamic acid for inducing alignment of a liquid crystal medium adjacent to a surface of an optical alignment layer comprising a polyamic acid of structure I wherein $R_1$, is selected from the group of $C_3-C_{20}$ linear or branched chain alkyl groups containing 1 to 4 sites of unsaturation; X is a divalent moiety selected from the group —O—, —S—and —NR—, wherein R is selected from H, $R_1$, and $C_1-C_4$ hydrocarbon chain; $X_1$ is independently selected from the group H, Cl, F, and Br; m is 1 or 0; Z is selected from the group —S—, —O—. —$SO_2$—, —$CH_2$—, —$C(CF_3)_2$—, —C(O)—. —$CH_2CH_2$—, —$NR_2$— and a covalent bond wherein $R_2$ is selected from H and $C_1-C_4$ hydrocarbon chain; and the carboxylic acid groups are ortho to the amide linkages.

DETAILED DESCRIPTION

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgettfilms, have all been shown to align liquid crystals.

"Optical alignment layer" herein refers to an alignment layer that contains anisotropically absorbing molecules that will induce alignment of liquid crystals after exposure with polarized light. The optical alignment layer can be an isotropic medium or have some degree of anisotropy before optical alignment. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropic absorbing molecules exhibit absorption bands between 150 nm and about 2000 nm. Most preferable optical alignment layers for the present invention have absorbance maxima of about from 150 to 400 nm and especially about from 300 to 400 nm.

Anisotropically absorbing molecules that can be used in optical alignment layers and various methods for forming optical alignment layers are discussed in U.S. Pat. No.

5,731,405 entitled "Process and Materials for Inducing Pre-tilt in Liquid Crystals and Liquid Crystal Displays, hereby incorporated by reference.

Polymers especially useful and preferred as optical alignment layers are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to give a poly(amic acid) prepolymer intermediate. Alternatively copolymer polyimides are prepared by the condensation of one or more diamines with one or more dianhydrides to give a copolyamic acid.

The poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by addition of a dehydrating agent to form a polyimide polymer.

In preparing polyamic acids for optical alignment layers the molar ratio of diamine to dianhydride usually is 1:1, but can vary between 0.8:1 to 1.2:1. The preferred ratio of diamine to dianhydride is between 0.9:1 and 1.1:1.

A novel polyamic acid of the invention for inducing alignment of a liquid crystal medium adjacent to a surface of an optical alignment layer comprises a polyamic acid of structure I

I wherein $R_1$ is selected from the group of $C_3$–$C_{20}$ linear or branched hydrocarbon chain containing 1 to 4 carbon-carbon double bonds; X is a divalent moiety selected from the group —O—, —S—, and —NR—, wherein R is selected from H, $R_1$, and $C_1$–$C_4$ hydrocarbon chain; $X_1$ is independently selected from the group H, Cl, F, and Br; m is 1 or 0; Z is selected from the group —S—, —O—. —$SO_2$—, —$CH_2$—, —$C(CF_3)_2$—, —C(O)—. —$CH_2CH_2$—, —$NR_2$— and a covalent bond wherein $R_2$ is selected from H and $C_1$–$C_4$ hydrocarbon chain; and the carboxylic acid groups are ortho to the amide linkages. Coatings of these polyamic acids, upon chemical or thermal imidization, give polyimide optical alignment layers that are useful for aligning liquid crystals. As will be discussed further below, the novel polyimide optical alignment layers provide high sensitivity to polarized light and improved electrical properties over polyimides without crosslinking functionality provided by the polyamic acids of structure I.

Preferred polyamic acids of structure I are those wherein $R_1$ is

Wherein $R_3$ is selected from the group of H and $C_1$–$C_{10}$ hydrocarbon chain; $R_4$ is selected from the group of $R_3$ and n is an integer from 1 to 10 and p is an integer from 0 to 10. More preferred polyamic acids are wherein $R_1$ is a $C_{10}$–$C_{20}$ linear or branched hydrocarbon chain containing 2 to 4 carbon-carbon double bonds. Also more preferred are polyamic acids wherein X is —NR—. Most preferred are polyamic acids wherein $R_1$ is selected from the group of geranyl, citronellyl and farnesyl groups.

Preferred polyamic acids of the invention are wherein m is 0 and $X_1$ is H or Cl. These are derived from 3,3',4,4'-benzophenonetetracarboxylic dianhydride and 2,2'-dichloro-4,4',5,5'-benzophenone tetracarboxylic dianhydride. Both materials are colorless, provide reasonable solubility characteristics to the polyamic acids, and provide a photoactive UV chromophore in high concentration.

The benzophenonetetracarboxylic dianhydrides are readily available from commercial sources or synthesis. For instance, 3,3',4,4'-benzophenonetetracarboxylic dianhydride (BTDA) is available from Aldrich Chemical Co., Inc. (1001 W. St. Paul Ave., Milwaukee, Wis. 53233). 2,2'-Dichloro-4, 4',5,5'-benzophenone tetracarboxylic dianhydride is available from 4-chloro-o-xylene by Friedel-Crafts acylation with oxalyl chloride to give 2,2'-dichloro-4,4',5,5',-tetramethylbenzophenone, followed by oxidation with nitric acid and dehydration of the resulting tetracarboxylic acid as described by Falcigno, et al., J. Poly. Sci. 1992, 30, 1433.

Other diaryl ketones dianhydrides that are useful in the process of the invention, wherein m is 1, are the polycyclic diaryl ketone dianhydrides described by Pfeifer, et al., in U.S. Pat. No. 4,698,295 and hereby incorporated by reference. Another diaryl ketone dianhydride that may be useful is 5,5'-[carbonylbis(4,1-phenyleneoxy)]bis-1,3-isobenzofuranone, Structure III:

III

A wide variety of other dianhydrides, of course, may be used in forming copolyamic acids. Specific examples of other tetracarboxylic dianhydride components include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

The novel polyamic acids of the invention require novel crosslinking diamines of structure wherein $R_1$ is selected from the group of $C_3$–$C_{20}$ linear or branched hydrocarbon chain containing 1 to 4 carbon-carbon double bonds and X is a divalent moiety selected from the group —O—, —S—, and —NR—, wherein R is selected from H, $R_1$, and $C_1$–$C_4$ hydrocarbon chain. Preferred diamines are wherein $R_1$ is a $C_{10}$–$C_{20}$ linear or branched hydrocarbon chain containing 2 to 4 carbon-carbon double bonds and X is —NR—, wherein R is selected from H, $R_1$, and $C_1$–$C_4$ hydrocarbon.

Specific examples of the novel crosslinking diamines are listed in Table 1 and their syntheses are described in the Examples. In general, a wide variety of crosslinking diamines of the invention are readily available by reaction of a secondary unsaturated amine with fluoro-2,4-dinitrobenzene or 3-fluoro-4-nitroaniline followed by reduction of the nitro groups to the corresponding primary amines. Many secondary unsaturated amines that would be useful in preparing the novel amines are commecially available including diallyl amine, and N-ethyl-2-methylallylamine. Other secondary unsaturated amines are available by synthesis including N-methyl-N-geranylamine, N-methyl-N-citronellylamine N-methyl-N-farnesylamine, N-methyl-N-oleylamine, and N-methyl-N-3-methylbutenamine.

Novel crosslinking diamines containing ether linkages are readily available by alkylation of 2,4-dinitrophenol or 2,5-dinitrophenol with unsaturated alkyl halides followed by reduction of the nitro groups to the corresponding primary amines. Commecially available unsaturated alkyl halides useful in preparing the novel amines include 5-bromo-1-pentene, 5-bromo-2-methyl-2-pentene, 6-bromo-1-hexene, 8-bromo-1-octene, 4-bromo-2-methyl-2-butene, geranyl bromide, farnesyl bromide, farnesyl chloride, and citronellyl bromide. Other alkyl halides useful in preparing the novel diamines are available by conversion of the corresponding unsaturated alcohols to bromides or chlorides. Useful alcohols include nerol (cis-3,7-dimethyl-2,6-octadien-1-ol), phytol (3,7,11,15-tetramethyl-2-hexadecen-1-ol), and β-citronellol.

A variety of other diamines may be useful in the preparation of novel copolyamic acids of the invention including aromatic diamines such as are 2,5-diaminobenzonitrile, 2-(trifluoromethyl)-1,4-benzenediamine, p-phenylenediamine, 2-chloro-1,4-benzenediamine, 2-fluoro-1,4-benzenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 4,4'-diaminobenzophenone, 3,4'-diaminobenzophenone, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane; and aliphatic diamines such as tetramehtylenediamine and hexamethylene diamine. Further, diaminosiloxanes such as bis(3-aminopropyl)tetramethyldisiloxane may be used. Such diamines may be used alone or in combination as a mixture of two or more of them. Preferred diamines for preparing copolyamic acids are 2,5-diaminobenzonitrile, 2-(trifluoromethyl)-1,4-benzenediamine and 1,4-phenylene diamine. Most preferred are 2,5-diaminobenzonitrile and 2-(trifluoromethyl)-1,4-benzenediamine.

Preferred copolyamic acids comprise the structure I (above) and additionally comprise structure II wherein $X_2$ is selected from the group H, $C_1$–$C_4$ hydrocarbon, —CN, —CF$_3$, F, Cl, Br, I, —NO$_2$, —OR$_2$, —CO$_2$R$_2$, and —CO$_2$N(R$_2$)$_2$, wherein $R_2$ is H or a $C_1$–$C_4$ hydrocarbon. A most preferred copolyamic acid is wherein $X_1$ is H, m is 0, and $X_2$ is selected from the group —CN and —CF$_3$.

Table 2 lists several diamines that are used in forming preferred copolyamic acids of the invention. Amines 15 and 16 in Table 2 exemplify structural elements that, when incorporated into polyimides, are useful in inducing pre-tilt properties in optical alignment layers. Typically, a polyamic acid wherein between about 1 to 20 mol % of the amine component comprises monoamine 15, or a combination of monoamine 15 and diamine 16, when converted to a polyimide optical alignment layer, will exhibit a finite pre-tilt when optically aligned. The pre-tilt is typically higher with polyimides comprising these amines than with polyimides not comprising one or more of these amines. Examples 28 thru 31 demonstrate copolyimides of the invention that also comprise pre-tilt inducing diamines.

Preferably the novel polyamic acids of the invention comprise about from 1 to 100 mol % of structure I; more preferably from 5 to 50 mol % of structure I; and most preferably from 5 to 25 mol % of structure I. A higher mol % of structure I tends to give a higher degree of crosslinking and improved electrical properties. However, improvement in voltage holding ratio (VHR) and the photosensitivity of the polyimide optical alignment layer is often observed at relatively low loading of structure I in a copolyamic acid.

To prepare the optical alignment layers the poly(amic acid) solutions or preimidized polyimide solutions are coated onto desired substrates. Coating is usually accomplished with 2 to 30 wt % solids. Any conventional method may be used to coat the substrates including brushing, spraying, spin-casting, meniscus coating, dipping or printing. The preferred techniques for coating substrates demonstrated in the Examples are spinning and printing. However, the optical alignment materials of the invention are not limited to use in printing or spinning processes.

The coated substrates are heated in an oven under an inert atmosphere, for instance nitrogen or argon, at elevated temperature usually not exceeding 300° C. and preferably at or below 180° C. for about from 1 to 12 hours, preferably for about 2 hours or less. The heating process removes the solvent carrier and may be used to further cure the polymer. For instance, the poly(amic) acid films are thermally cured to generate polyimide films.

The concentration of polymer and choice of solvents can affect the optical alignment quality, pretilt and VHR. For example, the optical alignment quality has been observed to improve under the same exposure conditions when the concentration of polymer is decreased in solution. In addition, the choice of solvent and/or co-solvents can also affect the alignment quality. A correlation between film thickness and alignment quality also is evident. In particular, the optical alignment quality improves with decreasing thickness. Similarly, VHR increases with decreasing film thickness.

The optical alignment layers are exposed to polarized light to induce alignment of liquid crystals. By "polarized light" is meant light that is elliptically polarized such that the light is more polarized along one axis (referred to as the major axis) versus the orthogonal axis (referred to as the minor axis). In this invention the polarized light has one or more wavelengths of about from 150 to 2000 nm and preferably of about from 150 and 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury arc deuterium and quartz tungsten halogen lamps, xenon lamps, microwave excited lamps and black lights in combination with a polarizer. Polarizers useful in generating polarized light from nonpolarized light sources are interference polarizers made from dielectric stacks, absorptive polarizers, diffraction gratings and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium.

Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. A preferred range of exposure energy is about from 0.001 to 100 $J/cm^2$ and most preferred range of exposure energy is about from 0.001 to 5 $J/cm^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

The quality of alignment and electrical properties of the liquid crystal cell assembled from exposed substrates can be improved by heating the substrates after exposure but prior to assembly of the cell. This additional heating of the substrates is not a requirement of the process but may give beneficial results.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:

(a) exposing at least one optical alignment layer to polarized light at a normal incidence, and

(b) exposing the optical alignment layer to polarized light at an oblique incidence.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell, injection filling and casting of a liquid crystal medium onto an optical alignment layer. Optical alignment layers are pre-exposed to polarized light or they are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include positive dielectric liquid crystals including 4-cyano-4'-alkylbiphenyls, 4-cyano-4'-alkyloxybiphenyls, 4-alkyl-(4'-cyanophenyl)cyclohexanes, 4-alkyl-(4'cyanobiphenyl) cyclohexanes, 4-cyanophenyl-4"alkylbenzoates, 4-cyanophenyl-4'alkyloxybenzoates, 4-alkyloxyphenyl-4'cyanobenzoates, 4-alkylphenyl-4'alkylbenzoates, 1-(4'-alkylphenyl)-4-cyanopyrimidines, 1-(4'-alkyloxyphenyl)-4-cyanopyrimidines and 1-(4-cyanophenyl)-4-alkylpyrimidines. Other useful liquid crystals are new superfluorinated liquid crystals available from EM Industries, (Hawthrone N.Y.) including the commercial materials: ZLI-5079, ZLI-5080, ZLI-5081, ZLI-5092, ZLI-4792, ZLI-1828, MLC-2016, MLC-2019, MLC-6252 and MLC-6043. Other useful nematic materials for practicing the invention include the commercial liquid crystals available from Lodic Co., Ltd, (Tokyo, Japan) including the DLC series: 22111, 22112, 22121, 22122, 23070, 23170, 23080, 23180, 42111, 42112, 42121, 42122, 43001, 43002, 43003, 63001, 63002, 63003, 63004, and 63005. Specific liquid crystals useful in the invention include the following structures wherein R' is a $C_3$–$C_7$ alkyl group:

The invention is not limited to the use of liquid crystals defined above. One skilled in the art will recognize that the invention will be of value with many diverse liquid crystal structures and formulations containing mixtures of liquid crystals.

The exposed optical alignment layer induces alignment of a liquid crystal medium at an angle + and −θ with respect to the direction of the linear polarization of the incident light beam and along the plane of the optical alignment layer. One skilled in the art will recognize that the process allows control of the alignment of a liquid crystal medium in any desired direction within the plane of the optical alignment layer by controlling the conditions of the polarized light exposure. Thus, θ can range from 0 to 180° to the polarization direction.

Figure 2:
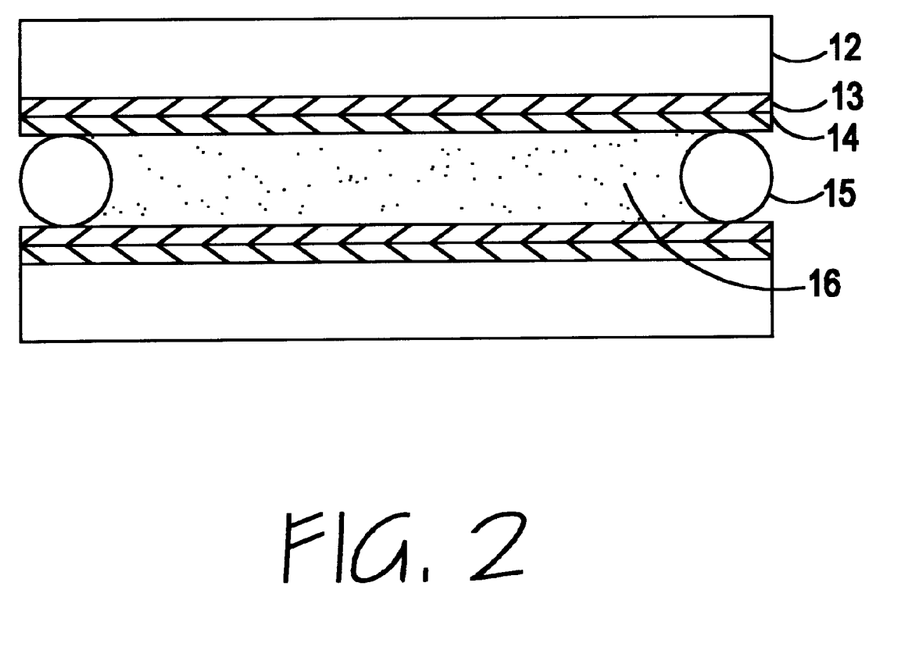
FIG. 2 is a cross-sectional view of a general liquid crystal display element of the present invention.

A liquid crystal display element of the invention is composed of an electrode substrate having at least one polyimide optical alignment layer derived from a polyamic acid of Structure I (above), a voltage-impressing means and a liquid crystal material. FIG. 2 illustrates a typical liquid crystal display element, comprising a transparent electrode 13 of ITO (indium-tin oxide) or tin oxide on a substrate 12 and optical alignment layers 14 formed thereon. The optical alignment layers are exposed to polarized light of a wavelength or wavelengths within the absorption band of the anisotropically absorbing molecules. A spacer concurrently with a sealing resin 15 is intervened between a pair of optical alignment layers 14. A liquid crystal 16 is applied by capillary filling of the cell and the cell is sealed to construct a liquid crystal display element. Substrate 12 may comprise an overcoat film such as an insulating film, a color filter, a color filter overcoat, a laminated polarizing film etc. These coatings and films are all considered part of the substrate 12. Further, active elements such as thin film transistors, a nonlinear resistant element, etc. may also be formed on the substrate 12. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

Optical alignment layers of the invention are compatible with all liquid crystal display modes. A liquid crystal display element of the invention can comprise a variety of display configurations including twisted nematic, super twisted nematic, in-plane-switching, vertical alignment, active-matrix, cholesteric, polymer dispersed, ferroelectric, anti-ferroelectric and multi-domain liquid crystal displays. Although the display modes demonstrated in this specification are primarily twisted nematic, the optical alignment layers of the invention are not limited to use in twisted nematic liquid crystal displays.

Optical alignment layers of the invention are useful in many other liquid crystal devices other than liquid crystal displays. These include electro-optical light modulators, all-optical light modulators, erasable read/write optical data storage media; diffractive optical components such as gratings, beamsplitters, lenses (e.g., Fresnel lenses), passive imaging systems, Fourier processors, optical disc and radiation collimators; binary optical devices formed by combining refractive and diffractive optics including eyeglasses, cameras, night vision goggles, robotic vision and three-dimensional image viewing devices; and holographic devices such as heads-up displays and optical scanners.

Voltage Holding Ratio (VHR) is a critical electrical parameter for liquid crystal displays. VHR is a measure of the LCDs ability to retain a voltage during the time between pixel updates (frame time). The type of liquid crystal, alignment layers and cell geometry can all affect the measured VHR value. In the examples to follow, liquid crystal test cells comprising soda-lime substrates with patterned indium-tin-oxide (ITO) transparent electrodes are described. The overlap of the electrodes was about 1 cm$^2$ after the test cell was assembled. Approximately 2–3 inch wire leads were attached to the patterned ITO electrodes using an ultrasonic solder iron after the test cell is assembled but prior to filing. The leads were attached to a VHR measurement system (Elsicon VHR-100 Voltage Holding Ratio Measurement System, Wilmington, Del.) using test clips after the cell was filled and annealed. The VHR for the examples was measured for a 20 msec frame time, which is typically used for measuring VHR. The VHR at room temperature for the various exposure conditions is summarized in Table 3.

The examples of the invention use fluorinated amines 15 and 16 that were prepared by the following procedures:

A mixture of 4-fluoronitrobenzene (141.1 g), 1H,1H-perfluorooctanol (420.1 g), and potassium hydroxide (79.2 g) in 1-methyl-2-pyrrolidinone (1.0 L) was stirred at room temperature for 16 h under a nitrogen atmosphere. The mixture was extracted from aqueous solution and concentrated to give 4-(1H,1H-perfluorooctyloxy)nitrobenzene which was reduced with hydrogen and 5% Pd/C. The product was distilled and recrystallized to give 4-(1H,1H-perfluorooctyloxy)benzeneamine, 15, as crystals, mp 49.1–50.2° C.

A mixture of 2,2,3,3,4,4,5,5-octafluoro-1,6-hexanediol (78.63 g, 0.3 mol, Aldrich Chemical Co., Milwaukee, Wis.), 1-fluoro-2,4-dinitrobenzene (18.6 g, 0.10 mmol), triethyl amine (42 mL, 0.3 mol) and acetone (100 mL) was heated to 80° C. for 1.5 hr. After aqueous workup the excess hexanediol was removed by Kugelrohr distillation and the dimer by-product was removed by crystallization. The mother liquor was concentrated to give an orange oil. A portion of the oil (8.5 g) was treated with tin chloride dihydrate (36.0 g), ethanol (40 mL) and 10 N hydrochloric acid (30 mL) for 17 h at 35° C. to give the diamine 16.

N-methylgeranylamine used in the examples was prepared by treatment of geranyl bromide with 12 fold excess of methylamine in ethanol. The product was isolated by extraction into ethyl ether and distillation. N-methylfarnesylamine, N-methylcitronellylamine and N-methyl-3-methyl-3-butenylamine are prepared in a similar manner. N-methyloleylamine was prepared by methylation of the N-oleylacetamide potassium salt followed by hydrolysis.

TABLE 1

| Diamine No. | Crosslinking Diamines Structure |
|---|---|
| 1 |  |

TABLE 1-continued

Crosslinking Diamines

| Diamine No. | Structure |
|---|---|
| 2 | 2,5-diamino-N,N-diallylaniline |
| 3 | 2,5-diamino-N-ethyl-N-(2-methylallyl)aniline |
| 4 | 4-amino-2-(allyloxy)aniline |
| 5 | 4-amino-2-(pent-4-enyloxy)aniline |
| 6 | 2,5-diamino-N-methyl-N-(3,7-dimethylocta-2,6-dienyl)aniline |
| 7 | 2,5-diamino-N-methyl-N-[(CH$_2$)$_8$-CH=CH-C$_8$H$_{17}$]aniline |
| 8 | 2,5-diamino-N-methyl-N-(3-methylbut-2-enyl)aniline |
| 9 | 4-amino-2-(3,7-dimethyloct-6-enyloxy)aniline |
| 10 | 2,5-diamino-N-methyl-N-(3,7-dimethyloct-6-enyl)aniline |
| 11 | 2,5-diamino-N-methyl-N-(3,7,11-trimethyldodeca-2,6,10-trienyl)aniline |
| 12 | 2,5-diamino-N-methyl-N-(3,7-dimethylocta-2,6-dienyl)aniline |

TABLE 2

Amines used to prepare polyamic acids in Example

| Diamine No. | Structure |
|---|---|
| 13 | 2,5-diamino-benzonitrile |
| 14 | 2,5-diamino-(trifluoromethyl)benzene |
| 15 | 4-amino-(OCH$_2$C$_7$F$_{15}$)aniline |
| 16 | 4-amino-2-(OCH$_2$(CF$_2$)$_4$CH$_2$OH)aniline |
| 17 | 1,4-phenylenediamine |

TABLE 3

Optical Alignment of Polyimide compositions, Processing Parameters and Results.

| Example No. | Polyimide Composition BDTA + Diamine No. (molar ratio in copolymers) | Wt % | Coating S = spincast P = printing | Exposure Laser scan mm/sec | Exposure Lamp J/cm² | Alignment Quality | VHR |
|---|---|---|---|---|---|---|---|
| 13a | 13 + 1 (0.9:0.1) | 4 | S | 0.75 | — | O+ | 0.962 |
| b | " | 4 | S | 1.5 | — | O+ | 0.966 |
| c | " | 4 | S | 3.0 | — | O+ | 0.931 |
| d | " | 4 | S | 6.0 | — | Δ | 0.890 |
| e | " | 3 | S | 6.0 | — | O+ | 0.948 |
| f | " | 5 | P | 3.0 | — | O+ | 0.958 |
| g | " | 5 | P | 6.0 | — | O | 0.931 |
| h | " | 5 | P | — | 40 | Δ++ | 0.967 |
| i | " | 5 | P | — | 20 | O+ | 0.968 |
| j | " | 5 | P | — | 10 | O | 0.965 |
| 14a | 13 + 1 (0.8:0.2) | 5 | S | 0.75 | — | Δ+ | 0.979 |
| b | " | 5 | S | 1.5 | — | O | 0.964 |
| 15a | 13 + 1 (1:1) | 5 | S | 0.75 | — | X++ | 0.985 |
| b | " | 5 | S | 1.5 | — | X | 0.982 |
| c | " | 5 | S | 6.0 | — | X | 0.966 |
| d | " | 5 | S | 10 | — | X | 0.962 |
| 16a | 1 | 5 | S | 0.75 | — | X++ | 0.981 |
| b | " | 5 | S | 1.5 | — | X | 0.981 |
| 17a | 13 + 2 (0.8:0.2) | 5 | S | 0.75 | — | Δ++ | 0.977 |
| b | " | 5 | S | 1.5 | — | O++ | 0.965 |
| 18a | 13 + 2 (0.9:0.1) | 4 | S | 0.75 | — | O++ | 0.956 |
| b | " | 4 | S | 1.5 | — | O+ | 0.959 |
| 19a | 13 + 3 (0.9:0.1) | 4 | S | 0.75 | — | Δ++ | 0.960 |
| b | " | 4 | S | 1.5 | — | O | 0.954 |
| c | " | 4 | S | 4.0 | — | O | 0.877 |
| 20a | 13 + 4 (0.8:0.2) | 4 | S | 0.75 | — | O+ | 0.959 |
| b | " | 4 | S | 1.5 | — | O+ | 0.967 |
| 21a | 13 + 5 (0.8:0.2) | 4 | S | 0.75 | — | O | 0.969 |
| b | " | 4 | S | 1.5 | — | O | 0.953 |
| c | " | 4 | S | 4.0 | — | Δ++ | 0.843 |
| 22a | 13 + 6 (0.9:0.1) | 4 | S | 0.75 | — | O++ | 0.970 |
| b | " | 4 | S | 1.5 | — | O++ | 0.964 |
| c | " | 4 | S | 4.0 | — | O++ | 0.953 |
| 23a | 13 + 6 (0.8:0.2) | 4 | 8 | 0.75 | — | O | 0.96 |
| b | " | 4 | S | 1.5 | — | O | 0.97 |
| c | " | 4 | S | 6.0 | — | Δ | 0.95 |
| 24a | 14 + 1 (0.9:0.1) | 5 | S | 0.75 | — | O++ | 0.874 |
| b | " | 5 | S | 1.5 | — | O++ | 0.942 |
| c | " | 5 | S | 4.0 | — | O+ | 0.836 |
| 25a | 17 + 1 (0.9:0.1) | 3 | S | 0.75 | — | O+ | 0.927 |
| b | " | 3 | S | 1.5 | — | Δ | 0.863 |
| 26a | 13 | 3 | S | 1.5 | — | Δ++ | 0.933 |
| b | 13 | 3 | S | 3.0 | — | Δ++ | 0.924 |
| 27a | 14 | 3.5 | S | 1.5 | — | O+ | 0.815 |
| b | 14 | 3.5 | S | 3.0 | — | Δ+ | 0.834 |
| 28a | 13, 1 + 15 (1.75:0.19:0.1) | 4 | S | 0.75 | — | Δ | 0.898 |
| b | " | 4 | S | 1.5 | — | X+ | 0.790 |
| 29a | 13, 4 + 15 (1.75:0.19:0.1) | 4 | S | 0.75 | — | O++ | 0.904 |
| b | " | 4 | S | 1.5 | — | O | 0.799 |
| 30a | 13, 2, 15, + 16 (0.8:0.1:0.05:0.075) | 4 | S | 0.75 | — | Δ | 0.892 |
| b | 13, 2, 15, + 16 (0.8:0.1:0.05:0.075) | 4 | S | 1.5 | — | X+ | 0.802 |
| 31a | 13, 1, 15, + 16 (0.81:0.1:0.025:0.075) | 4 | S | 0.75 | — | O++ | 0.911 |
| b | 13, 1, 15, + 16 (0.81:0.1:0.025:0.075) | 4 | S | 1.5 | — | O++ | 0.854 |

• Excellent alignment, no flow effects, high uniformity.
O Good alignment, low flow effects, uniform.
Δ Fair alignment, flow effects, some nonuniformity (mottled or cloudy background).
X Poor alignment, severe flow effects, nonuniform.
+ Levels of improvement, Δ < Δ+ < Δ++ < O Examples 1–12 describe the formation of novel crosslinking diamines 1–12 of the invention.

EXAMPLE 1

A mixture of 2,4-dinitrofluorobenzene (9.3 g, 50 mmol), 1-methylpyrrolidinone (50 mL), diallylamine (5.82 g, 60 mmol) and potassium carbonate (6.9 g, 50 mmol) was stirred at ambient temperature for 1 h. The mixture was poured into water (250 mL) and extracted with ethyl ether. The ether extract was washed with 0.5 N hydrochloric acid, water, and saturated brine solution, and dried over magnesium sulfate.

Concentration of the extract gave N,N-diallyl-2,4-dinitrobenzeneamine as a yellow oil (14.6 g).

The above yellow oil (14.6 g) was treated with a solution of tin (II) chloride dihydrate (90.0 g, 0.40 mol), 10 N hydrochloric acid (75 mL) and ethanol (250 mL, absolute) at 55–60° C. for 14.5 h. The mixture was poured into ice water (400 mL) and basified with 20 wt % potassium hydroxide solution (750 g) chilled to 0° C. The mixture was extracted with ethyl ether—tetrahydrofuran (4:1, 600 mL), and the combined extracts washed with deionized water three times, washed with saturated brine solution, and dried with magnesium sulfate. The mixture was concentrated to a yellow oil that was purified by chromatography on silica gel and kugelrohr distilled at 115–120° C. (0.1 mm Hg) to give N,N-diallyl-1,2,4-benzenetriamine, 1, as a yellow oil. $^1$H NMR (CDCl$_3$) 6.79 (d, 1H), 6.08 (m, 2H), 5.80 (m, 2H), 5.10 (m, 4H), 3.45 (dt, 4H), 4.0 (bs) and 3.5 (bs).

EXAMPLE 2

A mixture of 3-fluoro-4-nitroaniline (1.56 g, 10 mmol), 1-methylpyrolidinone (10 mL), diallylamine (1.94 g, 20 mmol) and potassium carbonate (1.38 g, 10 mmol) was heated to 115–125° C. for 9.5 h. The mixture was diluted with water, and extracted with ethyl ether. The combined extracts were washed with water, washed with saturated brine solution, and dried over magnesium sulfate. The extract was concentrated to give N,N-diallyl-6-nitro-1,3-benzenediamine as an orange oil (2.3 g).

The above orange oil (2.3 g, 10 mmol) was treated with a solution of tin (II) chloride dihydrate (9.0 g, 40 mmol), 10 N hydrochloric acid (10 mL), and ethanol (55 mL, absolute) at 40–50° C. for 18 h. The mixture was worked up as described in Example 1 (exceptions: 20 wt % potassium hydroxide solution (85 g) and hexane-ethyl acetate (1:1) were used in extraction). The crude oil that was purified by chromatography (silica gel) and kugelrohr distilled (115° C., 0.1 mm Hg) to give N,N-diallyl-1,2,5-benzenetriamine, 2, as a yellow oil (0.75 g). $^1$H NMR (CDCl$_3$) 6.58 (d, 1H), 6.41 (d, 1H), 6.33 (d of d, 1H), 5.80 (m, 2H), 5.13 (m, 4H), 3.51 (d, 4H), 3.6 (bs) and 3.3 (bs).

EXAMPLE 3

Treatment of N-2-methylallyl-N-ethylamine with 2,4-dinitrofluorobenzene as described in Example 1 gave N-2-methylallyl-N-ethyl-2,4-dinitrobenzeneamine as a red oil (13.0 g).

Treatment of the red oil (13.0 g) from above with tin chloride as described in Example 1 gave N-2-methylallyl-N-ethyl-1,2,4-benzenetriamine, 3, as a yellow oil (bp 100° C., 0.1 mm Hg). $^1$H NMR (CDCl$_3$) 6.83 (d, 1H), 6.1 (m, 2H), 4.92 (s, 1H), 4.83 (s, 1H), 4.05 (bs, 2H), 3.45 (bs, 2H), 3.31 (s, 2H), 2.79 (q, 2H), 1.76 (s, 3H), 0.93 (t, 3H).

EXAMPLE 4

A mixture of 2,5-dinitrophenol (7.36 g, 40 mmol), allyl bromide (4.84 g, 40 mmol), acetone (75 mL), 1methylpyr-rolidinone (3 mL) and potassium carbonate (11.0 g, 80 mmol) was heated to 50–60° C. for 22 h. The mixture was cooled to room temperature and filtered and the solid rinsed with ethyl acetate. The filtrate was concentrated and recrystallized from isopropanol-hexane (1:1) to give 2-allyloxy-1,4-dinitrobenzene as yellow crystals (8.36 g, mp 66.5–68° C.).

The above crystal (6.73 g, 0.03 mol) was dissolved in hot ethanol (60 mL, absolute) and added to a solution of tin (II) chloride (45.5 g, 0.24 mol), concentrated hydrochloric acid (36 mL), and ethanol (30 mL) at 40° C. The exothermic reaction was kept at 50° C. for 1 h and room temperature for 16 h. The mixture was diluted with water, basified with 20 wt % potassium hydroxide (380 g), and extracted with hexane-ethyl acetate (1:1). The combined extracts were washed with water twice and dried over magnesium sulfate. The extract was concentrated to an oil and distilled (115–120° C., 0.1 mm Hg) to give 2-allyloxy-1,4-benzenediamine, 4, as an oil. $^1$H NMR (CDCl$_3$) 6.57 (d, 1H), 6.26 (d, 1H), 6.19 (q, 1H), 6.06 (m, 1H), 5.39 (dq, 1H), 5.26 (dq, 1H), 4.50 (dq, 2H), 3.37 (bs, 4H).

EXAMPLE 5

A mixture of 2,4-dinitrophenol (11.5 g, 80 wt %), 5-bromo-1-pentene (8.94 g, 0.06 mol), potassium carbonate (6.9 g, 0.05 mol) and 1-methylpyrrolidinone (100 mL) was heated to 80–90° C. for 4 days. Further portions of 5-bromo-1-pentene were added after 2 days (4.3 g) and 3 days (3.23 g). The mixture was diluted with water and extracted with hexane-ethyl acetate (1:2). The combined extracts were washed with 10 wt % potassium hydroxide (100 mL) three times and three times with water (100 mL) and then dried with magnesium sulfate. The solution was concentrated to give an oil. (13.4 g).

The oil (13.4 g, 0.053 mol) was treated with tin (II) chloride dihydrate as described in Example 1 (exceptions: reaction temperature was 40° C. and the extraction solvent was hexane-ethyl acetate, 1:1). The crude oil was distilled to give a forerun (70–80° C., 0.1 mm Hg) and the desired 4-(4'-pentenyloxy)-1,3-benzenediamine, 5, (135–140° C.) as an oil (4.62 g).

EXAMPLE 6

A mixture of N-methylgeranylamine (1.35 g, about 90 wt %, 7.3 mmol), potassium carbonate (1.38 g, 10 mmol), 3-fluoro-4-nitroaniline (1.14 g, 7.3 mmol) and 1-methylpyrrolidinone (10 mL) was stirred at 90–125° C. for 2.5 h. The mixture was diluted with water; extracted with ethyl ether; the extracts were washed twice with water and once with saturated brine solution; and extract was dried over magnesium sulfate. Concentration gave a orange oil that was purified by chromatography on silica gel (hexane-ethyl acetate, 3.5:1) to give 1.3 g orange oil (59%).

The orange oil (1.3 g, 4.3 mmol) was treated with tin chloride dihydrate as described in example 1 (exceptions: reaction temperature was 30–34° C. for 2.5 h; and the extraction solvent was ethyl ether). The crude oil recovered from the extraction was purified by chromatography on silica gel (hexane-ethyl acetate-tetrahydrofuran, 1:1:1) to give N-methyl-N-geranyl-1,2,5-benzenetriamine, diamine 6, as an oil (0.96 g).

EXAMPLE 7

Treatment of 2,4-dinitrofluorobenzene with N-methyloleylamine is performed as described in Example 1. The resulting dinitro compound is treated with tin (II) chloride dihydrate and purified by chromatography to give the diamine 7.

EXAMPLE 8

Treatment of 2,4-dinitrofluorobenzene with N-methyl-3-methyl-3-butenylamine is performed as described in Example 1. The resulting dinitro compound is treated with tin (II) chloride dihydrate and purified by chromatography and distillation to give the diamine 8.

EXAMPLE 9

Treatment of 2,4-dinitrophenol with 8-bromo-2,6-dimethyl-2-octene is performed as described in Example 5. The resulting dinitro compound is treated with tin (II) chloride dihydrate and purified by chromatography to give the diamine 9.

EXAMPLE 10

Treatment of 3-fluoro-4-nitroaniline with N-methylcitronellylamine is performed as described in Example 6. The resulting nitroamine is treated with tin (II) chloride dihydrate and purified by chromatography to give the diamine 10.

EXAMPLE 11

Treatment of 3-fluoro-4-nitroaniline with N-methylfamesylamine is performed as described in Example 6. The resulting nitroamine is treated with tin (II) chloride dihydrate and purified by chromatography to give the diamine 11.

EXAMPLE 12

Treatment of 2,4-dintirofluorobenzene with N-methylgeranylamine is performed as described in Example 1. The resulting dinitro compound is treated with tin (II) chloride dihydrate and purified by chromatography to give the diamine 12.

EXAMPLE 13

A mixture of 3,3',4,4'-benzophenonetetracarboxylic dianhydride (428.3 mg, 1.33 mmol), 2,5-diaminobenzonitrile, 13, (159.3 mg, 1.20 mmol), N,N-diallyl-1,2,4-benzenetriamine (diamine 1, 27.0 mg, 0.133 mmol) and γ-butyrolactone (2.44 g) was stirred at room temperature for 20.5 h under a nitrogen atmosphere. The polyamic acid solution was diluted to 4 wt % with γ-butyrolactone (12.0 g).

Two 0.9 inch by 1.2 inch by 1 millimeter thick soda lime glass substrates with transparent indium-tin-oxide (ITO) coatings (DCI, Inc. Lenexa, Kans. 66219) were spin-coated and cured with the polyimide formulation to give optical alignment layers. Spin coating was achieved by filtering the prepolymer solution through a 0.45 micron Teflon filter membrane directly onto the surface of the clean ITO substrate. The coated substrates were spun at 2500 RPM for 1 minute to produce uniform thin films. The resultant thin films were cured under nitrogen for 0.25 hr at 80° C. followed by 1 hr. at 180° C.

Figure 1:
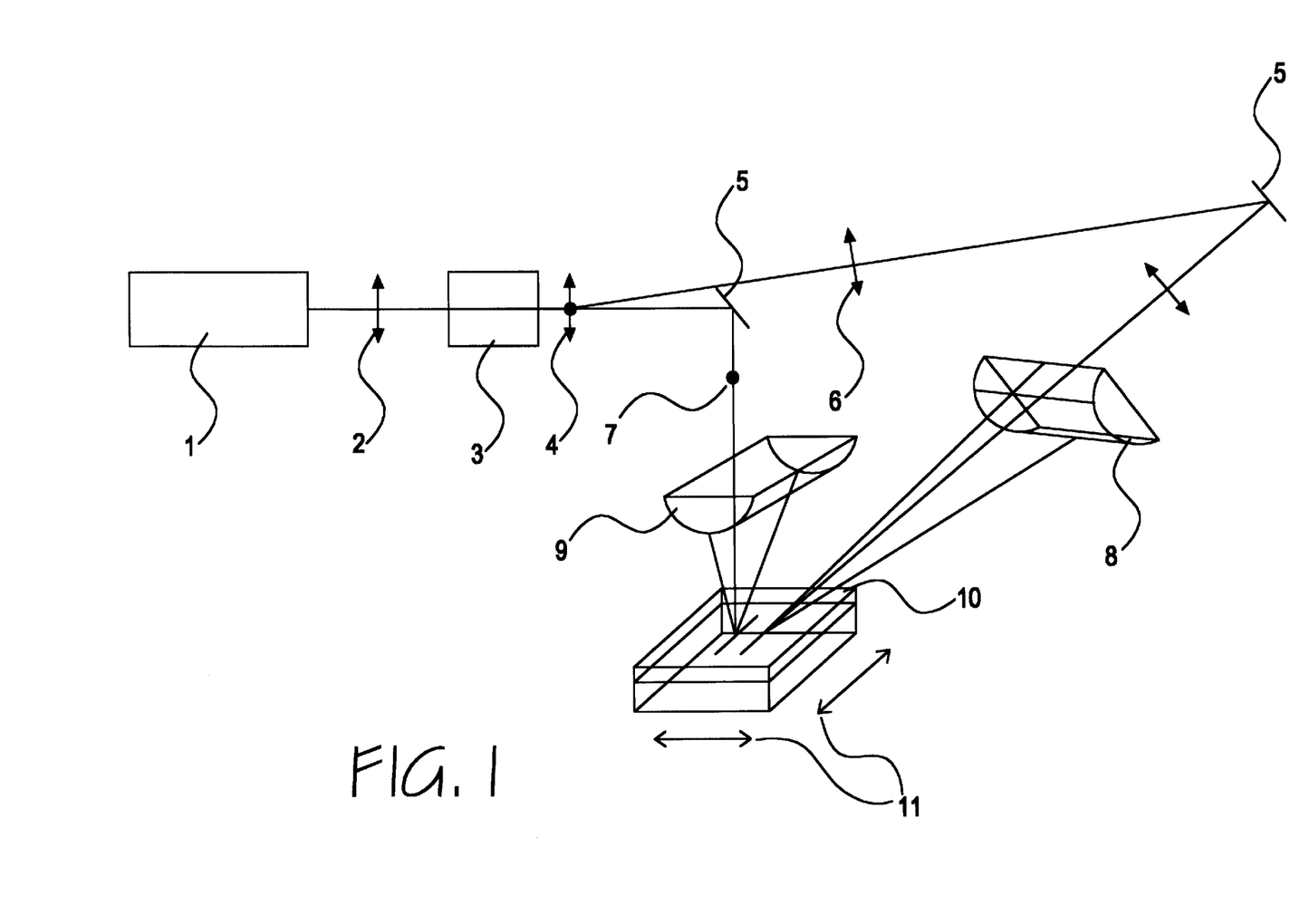
FIG. 1 shows a system that can be used to expose optical alignment layers to ultraviolet light.

FIG. 1 is a schematic of the experimental set-up used to expose the substrates. The laser beam of about 1 cm diameter from laser 1, polarized along direction 2, entered a polarizing rotator and beam splitter combination 3 and, upon exiting, two polarization components 6 and 7 separated as they propagated away from 3. The wavelength range of the laser was 300–336 nm. By adjusting the polarizing rotator in 3, the ratio of optical power in 6 and 7 can be adjusted and, in this case, the ratio was adjusted to be 1:6. The total power in 6 and 7 was 500 mW. Mirrors 5 reflected 6 and 7 through cylindrical lenses 8 and 9 with focal lengths of 5 cm and 10 cm, respectively. After passing through cylindrical lenses 8 and 9, 6 and 7 were focused into lines of about 1 cm ×0.2 cm onto the substrate(s) 10. The separation between the two parallel focused lines was about 1.5 mm. As depicted in FIG. 2, the substrates 10 were scanned perpendicular to the focused lines. Since the focused line lengths of about 1 cm was smaller than the desired exposure area, after scanning one time, the substrates were stepped 1.5 mm perpendicular to the scan direction (along the focused lines). The step and scan 11 were repeated until the entire substrate area was exposed. The scan speed for this exposure was 0.75 mm/s.

After exposure, the substrates were assembled with orthogonal orientation of the optically generated alignment direction. The cell thickness was about 4 microns. The cell was subsequently capillary filled with nematic liquid crystals suitable for active matrix liquid crystal displays. As expected, the liquid crystals were observed to align in a twisted nematic orientation when viewed between polarizers. Upon annealing the liquid crystal cell above the liquid crystal isotropic point (135° C. for 40 minutes), the uniformity of the alignment was observed to improve. The quality of the alignment for the annealed cell is described in Table 3.

Further trials (b, c and d) using scan speeds of 1.5, 3.0, and 6.0 mm/sec are listed in Table 3. In a further trial (e) the polymer solution before spin-casting was diluted with a mixture of γ-butyrolactone and 2-butoxyethanol to give a 3 wt % solution containing 50 wt % 2-butoxyethanol.

In further trials f–j the 5 wt % polymer solution containing 52.6 wt % 2-butoxyethanol was printed on the substrates using a Nissho Printing Co. Angstromer SDR printer (Kenix Industries, Tempe, Ariz.). In trials h–j the printed substrates were exposed with polarized light using a lamp exposure unit similar to OptoAlign™ model E2-UV-600-SS-AA exposure unit (Elsicon, Inc., Wilmington, Del.).

EXAMPLE 14

A mixture of 3,3',4,4'-benzophenonetetracarboxylic dianhydride (162.6 mg, 0.505 mmol), 2,5-diaminobenzonitrile, 13, (53.7 mg, 0.403 mmol), N,N-diallyl-1,2,4-benzenetriamine (diamine 1, 20.5 mg, 0.101 mmol) and γ-butyrolactone (0.92 g) was stirred at room temperature for 22 h under a nitrogen atmosphere. The polyamic acid solution was diluted to 5 wt % with γ-butyrolactone (3.58 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 15

A mixture of 3,3',4,4'-benzophenonetetracarboxylic dianhydride (215.3 mg, 0.668 mmol), 2,5-diaminobenzonitrile, 13, (44.5 mg, 0.334 mmol), N,N-diallyl-1,2,4-benzenetriamine (diamine 1, 67.9 mg, 0.334 mmol) and γ-butyrolactone (1.33 g) was stirred at 60–70° C. for 20.5 h under a nitrogen atmosphere. The polyamic acid solution was diluted to 5 wt % with γ-butyrolactone (4.90 g), filtered through a 0.45 micron Teflon membrane filter. The solution was spin coated, cured and exposed to polarized light as described in Example 13. The quality of the alignment for the cell and VHR for various trial conditions is described in Table 3.

EXAMPLE 16

A mixture of 3,3',4,4'-benzophenonetetracarboxylic dianhydride (201.8 mg, 0.626 mmol), N,N-diallyl-1,2,4-benzenetriamine (diamine 1, 127.2 mg, 0.626 mmol) and γ-butyrolactone (1.31 g) was stirred at room temperature for 20.5 h under a nitrogen atmosphere. The solution was diluted to 5 wt % with γ-butyrolactone (4.94 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 17

A mixture of 3,3',4,4'-benzophenonetetracarboxylic dianhydride (163.4 mg, 0.507 mmol), N,N-diallyl-1,2,5-benzenetriamine (diamine 2, 20.6 mg, 0.101 mmol), 2,5-diaminobenzonitrile, 13, (54.0 mg, 0.406 mmol), and γ-butyrolactone (0.94 g) was stirred at room temperature for 20.5 h under a nitrogen atmosphere. The solution was diluted to 5 wt % with γ-butyrolactone (3.58 g), filtered through a 0.45 micron Teflon membrane filter, and spin coated, cured and exposed to polarized light as described in Example 13.The quality of the alignment for the cell and VHR for various trial conditions is described in Table 3.

EXAMPLE 18

A mixture of 3,3',4,4'-benzophenonetetracarboxylic dianhydride (226.9 mg, 0.704 mmol), N,N-diallyl-1,2,5-benzenetriamine (diamine 2, 14.3 mg, 0.070 mmol), 2,5-diaminobenzonitrile, 13, (84.4 mg, 0.634 mmol), and γ-butyrolactone (1.43 g) was stirred at room temperature for 20.5 h under a nitrogen atmosphere. The solution was diluted to 4 wt % with γ-butyrolactone (6.38 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 19

A mixture of 3,3',4,4'-benzophenonetetracarboxylic dianhydride (172.8 mg, 0.536 mmol), N-2-methylallyl-N-ethyl-1,2,4-benzenetriamine, 3, (11.0 mg, 0.054 mmol), 2,5-diaminobenzonitrile, 13, (64.3 mg, 0.483 mmol), and γ-butyrolactone (1.02 g) was stirred at room temperature for 21 h under a nitrogen atmosphere. The solution was diluted to 4 wt % with γ-butyrolactone (4.86 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 20

A mixture of 3,3',4,4'-benzophenonetetracarboxylic dianhydride (290.5 mg, 0.902 mmol), 2-allyloxy-1,4-benzenediamine, 4, (29.6 mg, 0.180 mmol), 2,5-diaminobenzonitrile, 13, (96.0 mg, 0.721 mmol), and γ-butyrolactone (1.72 g) was stirred at room temperature for 21 h under a nitrogen atmosphere. The solution was diluted to 4 wt % with γ-butyrolactone (8.26 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 21

A mixture of 3,3',4,4'-benzophenonetetracarboxylic dianhydride (259.0 mg, 0.804 mmol), 4-(4'-pentenyloxy)-1,3-benzenediamine, 5, (30.9 mg, 0.161 mmol), 2,5-diaminobenzonitrile, 13, (85.6 mg, 0.643 mmol), and γ-butyrolactone (1.48 g) was stirred at room temperature for 21 h under a nitrogen atmosphere. The solution was diluted to 4 wt % with γ-butyrolactone (7.54 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 22

A mixture of 3,3',4,4'-benzophenonetetracarboxylic dianhydride (200.5 mg, 0.622 mmol), N-methyl-N-geranyl-1,2,5-benzenetriamine, diamine 6, (17.0 mg, 0.062 mmol), 2,5-diaminobenzonitrile, 13, (74.6 mg, 0.560 mmol), and γ-butyrolactone (1.11 g) was stirred at room temperature for 23 h under a nitrogen atmosphere. The solution was diluted to 4 wt % with γ-butyrolactone (5.90 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 23

A mixture of 3,3',4,4'-benzophenonetetracarboxylic dianhydride (175.2 mg, 0.544 mmol), N-methyl-N-geranyl-1,2,5-benzenetriamine, diamine 6, (29.7 mg, 0.109 mmol), 2,5-diaminobenzonitrile, 13, (57.9 mg, 0.435 mmol), and γ-butyrolactone (1.06 g) was stirred at room temperature for 21.5 h under a nitrogen atmosphere. The solution was diluted to 4 wt % with γ-butyrolactone (5.25 g), filtered through a 0.45 micron Teflon membrane filter, and spin coated, cured and exposed to polarized light as described in Example 13. The quality of the alignment for the cell and VHR for various trial conditions is described in Table 3.

EXAMPLE 24

A mixture of 3,3',4,4'-benzophenonetetracarboxylic dianhydride (244.3 mg, 0.758 mmol), 2-(trifluoromethyl)-1,4-benzenediamine, 14, (120 mg, 0.682 mmol), N,N-diallyl-1,2,4-benzenetriamine, 1, (15.4 mg, 0.076 mmol) and γ-butyrolactone (1.56 g) was stirred at room temperature for 23.5 h under a nitrogen atmosphere. The solution was diluted to 5 wt % with γ-butyrolactone (5.62 g), filtered through a 0.45 micron Teflon membrane filter, spin coated, cured and exposed to polarized light as described in Example 13. The quality of the alignment for the cell and VHR for various trial conditions is described in Table 3.

EXAMPLE 25

A mixture of 3,3',4,4'-benzophenonetetracarboxylic dianhydride (272.9 mg, 0.847 mmol), 1,4-phenylenediamine, 17, (82.4 mg, 0.762 mmol), N,N-diallyl-1,2,4-benzenetriamine, 1, (17.2 mg, 0.085 mmol) and 1-methylpyrollidone (1.54 g) was stirred at room temperature for 21 h under a nitrogen atmosphere. The solution was diluted to 3 wt % with 1-methylpyrrolidone (11.0 g), filtered through a 0.45 micron Teflon membrane filter, spin coated, cured and exposed to polarized light as described in Example 13. The quality of the alignment for the cell and VHR for various trial conditions is described in Table 3.

EXAMPLE 26 (Comparative)

A mixture of 3,3',4,4'-benzophenonetetracarboxylic dianhydride (6.44 g), 2,5-diaminobenzonitrile, 13, (2.66 g) and γ-butyrolactone (37.8 g) was stirred at room temperature for 20 h under a nitrogen atmosphere. The solution was diluted to a 10 wt % solution with γ-butyrolactone (43.9 g) and filtered through a 0.45 micron Teflon membrane filter. The solution was diluted to 3 wt % solution and spin coated, cured and exposed to polarized light as described in Example 13. The quality of the alignment for he cell and VHR for various trial conditions is described in Table 3. Comparison of Example 26 with Example 13, containing the crosslinking diamine 1, indicates that alignment quality and VHR are significantly improved in Example 13.

EXAMPLE 27 (Comparative)

A mixture of 3,3',4,4'-benzophenonetetracarboxylic dianhydride (6.44 g), 2-(trifluoromethyl)-1,4-benzenediamine, 14, (3.52 g) and γ-butyrolactone (40 g) was stirred at room temperature for 24 h under a nitrogen atmosphere. The solution was diluted to a 10 wt % solution with γ-butyrolactone (49.7 g) and filtered through a 0.45 micron Teflon membrane filter. The solution was diluted to 3.5 wt % solution and spin coated, cured and exposed to polarized light as described in Example 13. The quality of the alignment for the cell and VHR for various trial conditions is described in Table 3. Comparison of Example 27 with Example 24, containing the crosslinking diamine 1, indicates that alignment quality and VHR are significantly improved in Example 24. Thus, the crosslinking diamines give high quality alignment and high VHR at lower exposure energy levels than similar formulations not containing the crosslinking diamines of the invention.

EXAMPLE 28

A mixture of 3,3',4,4'-benzophenonetetracarboxylic dianhydride (6.44 g, 20 mmol),), 2,5-diaminobenzonitrile, 13, (2.334 g, 17.55 mmol), N,N-diallyl-1,2,4-benzenetriamine, 1, (0.396 g, 1.95 mmol) and γ-butyrolactone (36.5 g) was stirred at room temperature for 23.5 h under a nitrogen atmosphere. The temperature was raised to 60° C. and 4-(1H,1H-perfluorooctyloxy)benzeneamine, 15, (0.491 g, 1 mmol) in γ-butyrolactone (2.26 g) was added followed by continued heating for 21 h. The solution was cooled and diluted to a 10 wt % solution with γ-butyrolactone (48.3 g) and filtered through a 0.45 micron Teflon membrane filter. The solution was diluted to 4 wt % solution and spin coated, cured and exposed to polarized light as described in Example 13. The quality of the alignment for the cell and VHR for various trial conditions is described in Table 3. The cells exhibited a pre-tilt of 1 and 1.5 degrees at 0.75 and 1.5 mm/sec exposure, respectively.

EXAMPLE 29

A mixture of 3,3',4,4'-benzophenonetetracarboxylic dianhydride (6.44 g, 20 mmol),), 2,5-diaminobenzonitrile, 13, (2.334 g, 17.55 mmol), 2-allyloxy-1,4 -benzenediamine, 4, (0.320 g, 1.95 mmol) and γ-butyrolactone (36.7 g) was treated as described in Example 28 with further addition of 4-(1H,1H-perfluorooctyloxy)benzeneamine, 15, (0.491 g, 1 mmol). The final solution was diluted to 4 wt % solution and spin coated, cured and exposed to polarized light as described in Example 13. The quality of the alignment for the cell and VHR for various trial conditions is described in Table 3. The cells exhibited a pre-tilt of 0.6 and 1.2 degrees at 0.75 and 1.5 mm/sec exposure, respectively.

EXAMPLE 30

A mixture of 3,3',4,4'-benzophenonetetracarboxylic dianhydride (6.44 g, 20 mmol),), 2,5-diaminobenzonitrile, 13, (2.127 g, 16 mmol), N,N-diallyl-1,2,5-benzenetriamine, 2, (0.406 g, 2.0 mmol), and diamine 16 (0.552 g, 1.5 mmol) and γ-butyrolactone (37.9 g) was treated as described in Example 28 with further addition of 4-(1H,1H-perfluorooctyloxy)benzeneamine, 15, (0.491 g, 1 mmol). The final solution was diluted to 4 wt % solution and spin coated, cured and exposed to polarized light as described in Example 13. The quality of the alignment for the cell and VHR for various trial conditions is described in Table 3. The cells exhibited a pre-tilt of 0.6 and 1.2 degrees at 0.75 and 1.5 mm/sec exposure, respectively.

EXAMPLE 31

A mixture of 3,3',4,4'-benzophenonetetracarboxylic dianhydride (6.44 g, 20 mmol),), 2,5-diaminobenzonitrile, 13, (2.156 g, 16.2 mmol), N,N-diallyl-1,2,4-benzenetriamine, 1, (0.412 g, 2.03 mmol), and diamine 16 (0.552 g, 1.5 mmol) and γ-butyrolactone (37.9 g) was treated as described in Example 28 with further addition of 4-(1H,1H-perfluorooctyloxy)benzeneamine, 15, (0.245 g, 0.5 mmol). The final solution was diluted to 4 wt % solution and spin coated, cured and exposed to polarized light as described in Example 13. The quality of the alignment for the cell and VHR for various trial conditions is described in Table 3. The cells exhibited a pre-tilt of 0.3 and 0.5 degrees at 0.75 and 1.5 mm/sec exposure, respectively.

What is claimed is:

1. A polyamic acid for inducing alignment of a liquid crystal medium adjacent to a surface of an optical alignment layer comprising a polyamic acid of structure I wherein $R_1$ is selected from the group of $C_3$–$C_{20}$ linear or branched hydrocarbon chain containing 1 to 4 carbon-carbon double bonds; X is a divalent moiety selected from the group —O—, —S—, and —NR—, wherein R is selected from H, $R_1$, and $C_1$–$C_4$ hydrocarbon chain; $X_1$ is independently selected from the group H, Cl, F, and Br; m is 1 or 0; Z is selected from the group —S—, —O—. —$SO_2$—, —$CH_2$—, —$C(CF_3)_2$—, —C(O)—. —$CH_2CH_2$—, —$NR_2$— and a covalent bond wherein $R_2$ is selected from H and $C_1$–$C_4$ hydrocarbon chain; and the carboxylic acid groups are ortho to the amide linkages.

2. A polyamic acid of claim 1 wherein $R_1$ is a $C_{10}$–$C_{20}$ linear or branched hydrocarbon chain with containing 2 to 4 carbon-carbon double bonds.

3. A polyamic acid of claim 2 wherein $R_1$ is selected from the group of geranyl, citronellyl and farnesyl.

4. A polyamic acid of claim 1 wherein X is —NR—.

5. A polyamic acid of claim 1 wherein m is 0 and $X_1$ is H or Cl.

6. A polyamic acid of claim 1 that is a copolymer additionally comprising structure II

II wherein $X_2$ is selected from the group H, $C_1$–$C_4$ hydrocarbon, —CN, —$CF_3$, F, Cl, Br, I, —$NO_2$, —$OR_2$, —$CO_2R_2$, and —$CO_2N(R_2)_2$, wherein $R_2$ is H or a $C_1$–$C_4$ hydrocarbon.

7. An optical alignment layer comprising a polyimide derived from the polyamic acid of claim 1.

8. A liquid crystal display element comprising the optical alignment layer of claim 7.

* * * * *